G. W. HARTWELL.
Attaching Handles to Vessels.
No. 166,364. Patented Aug. 3, 1875.
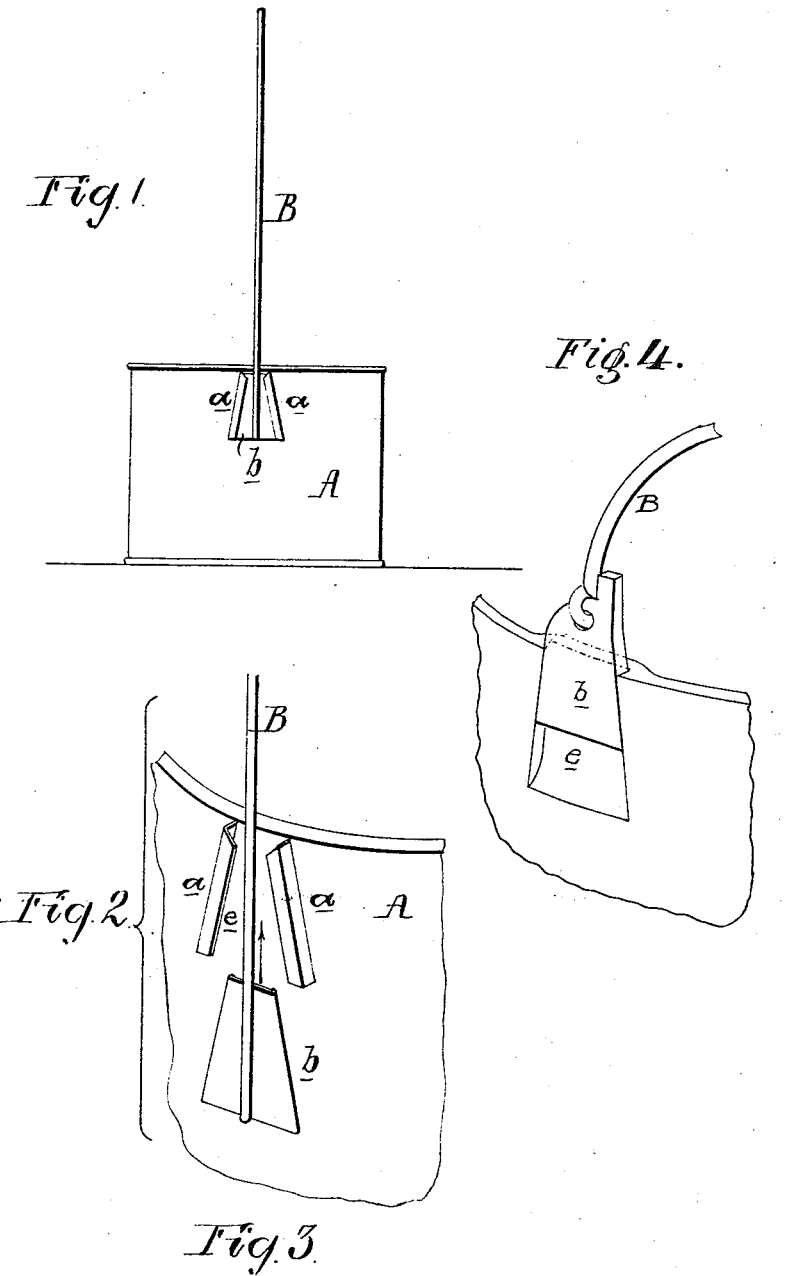

UNITED STATES PATENT OFFICE.

GEORGE W. HARTWELL, OF CINCINNATI, OHIO.

IMPROVEMENT IN ATTACHING HANDLES TO VESSELS.

Specification forming part of Letters Patent No. 166,364, dated August 3, 1875; application filed July 19, 1875.

*To all whom it may concern:*

Be it known that I, GEORGE W. HARTWELL, of Cincinnati, Ohio, have invented an Improved Method of Attaching Handles to Vessels, of which the following is a specification:

The object of my invention is to so connect handles to tin cans, buckets, and vessels of sheet or cast metal that the handles can be readily detached; and this object I attain in the manner which I will now proceed to describe, reference being had to the accompanying drawing, in which—

Figure 1 is a side view of a can or pail with the handle attached; Fig. 2, a perspective view, showing the mode of attaching the handle; Fig. 3, a section; and Fig. 4, a view showing the invention applied to a cast-metal vessel.

On opposite sides of the vessel A, near the top, are wedge-shaped sockets $e$, widest at the bottom, for the reception of similarly-shaped plates $b$, one of which is secured rigidly or is jointed to each end of the bent wire handle B. To secure the handle to the vessel each plate $b$ is inserted from below into the tapering socket and raised until firmly wedged in its place, when the handle will be securely connected, but so as to be readily detached by forcing the plates downward.

The socket may be formed by securing to each side of the vessel strips $a\ a$, flanged as shown in Fig. 3, so as to more securely confine the blocks; or recesses may be formed in the body of the vessel, as shown in Fig. 4. The latter plan is specially suitable for cast-metal vessels, as stove and hollow ware, the usual ears on which prevent the vessels from being compactly packed for transportation.

I claim—

1. A vessel having at the sides tapering sockets $e\ e$, adapted to tapering plates $b$, secured to the ends of a handle, B, substantially as set forth.

2. The combination of a vessel having sockets $e\ e$ and a handle provided with plates $b\ b$, adapted to said sockets, as set forth.

In testimony whereof I have signed my name to this specification in the presence of two subscribing witnesses.

GEORGE W. HARTWELL.

Witnesses:
 JUDSON HARMON,
 RICHARD T. DURRELL.